United States Patent [19]

Vali et al.

[11] Patent Number: 5,012,499

[45] Date of Patent: Apr. 30, 1991

[54] GAMMA RAY DETECTING DEVICE USING DISLOCATION-FREE CRYSTAL

[75] Inventors: Victor Vali, Laguna Hills; David B. Chang, Tustin, both of Calif.

[73] Assignee: Hughes Aircraft Company, Los Angeles, Calif.

[21] Appl. No.: 423,830

[22] Filed: Oct. 19, 1989

[51] Int. Cl.$^5$ .............................................. G21K 1/06
[52] U.S. Cl. ........................................ 378/84; 378/145
[58] Field of Search ..................... 378/43, 145, 71, 84, 378/82

[56] References Cited

U.S. PATENT DOCUMENTS 3,991,309  11/1976  Hauer ................................. 378/145

*Primary Examiner*—Graig E. Church
*Attorney, Agent, or Firm*—Wanda K. Denson-Low; Michael W. Sales

[57] ABSTRACT

A γ-ray detector that comprises a dislocation-free single crystal. Typical crystals include silicon and germanium, for example. The crystal is surrounded by an active shield that functions as an anticoincidence counter and a γ-ray detector is disposed adjacent the crystal in order to detect received -65 -rays. The γ-ray detector comprises an imaging proportional counter, scintillation counter, or a γ-ray detecting charge coupled device, for example. The γ-ray detector of the present invention is based on the Bormann effect, which is the anomalous transmission of γ-rays through dislocation free single crystals at the Bragg angle. For extended sources, data processing is provided to separate the directional and wavelength dependence of the intensity variation. The γ-ray detector has angular resolution of at least one arc second and may have an effective aperture of several square meters. Reduction in background radiation, which is essentially determined by the crystal thickness, may be made quite large, greater than $10^{12}$. Consequently, the use of the present invention makes it possible to detect a weak γ-ray source even in the presence of a large isotropic background.

10 Claims, 1 Drawing Sheet

GAMMA RAY DETECTING DEVICE USING DISLOCATION-FREE CRYSTAL

BACKGROUND

The present invention relates to devices for observing and mapping γ-ray emitting objects, and more particularly to a γ-ray detecting device which utilizes a dislocation-free crystal.

The existence of γ-ray astronomical objects is a relatively recent discovery in scientific history. This is primarily due to the high absorption rate of γ-rays by the atmosphere, whereby detection of such γ-ray emitting sources can only be performed from high altitude observatories such as balloon or satellite-borne telescopes. Gamma ray telescopes have been developed to study these celestial γ-ray emitting sources. One of the more interesting regions in the γ-ray spectrum for celestial bodies is in the region of 511 keV. However, at this energy level, the short wavelength of the γ-rays render grazing-incidence γ-ray telescopes substantially ineffective, the upper energy level for such instruments being typically on the order of 40 keV. Coded aperture telescopes can extend the observation region to much higher energies, on the order of 1000 keV. However, no conventional high resolution γ-ray telescopes exist that are suitable for studying γ-rays in the higher intensity, short wavelength regions.

γ-rays have also been used to examine the internal structure or contents of an object. Such examination is generally effective only when a significant spatial variation in the density of the object exists. This limitation is in part a result of (1) the ability of γ-rays to penetrate materials and (2) limitations on the ability to distinguish between target emitted γ-rays and background radiation.

Therefore, there has been a need in the art for an γ-ray detector capable of detecting and resolving high energy γ-rays up to 10–20 MeV. There has also been a need for an γ-ray imaging system that is capable of examining the structure or contents of an object in a reliable manner.

SUMMARY OF THE INVENTION

Broadly, the present invention provides a γ-ray or x-ray detector or collimator that comprises a dislocation-free crystal. Typical presently available dislocation-free crystals are silicon and germanium. An active shield employed as an anticoincidence counter surrounds the crystal. A detector is disposed adjacent the crystal to count γ-rays transmitted by the crystal and hence provide for detection of γ-rays emitted from the remote source. The γ-ray detector or collimator of the present invention has angular resolution of at least one arc second and may have an effective aperture of several square meters, depending on crystal size.

The present invention employs the Borrmann effect, which is the anomalous transmission of γ-rays or x-rays through a dislocation-free single crystal incident at the Bragg angle. As a detector, the use of the single crystal positioned at a particular Bragg angle relative to a remote γ-ray source provides a means to detect the presence of emitted γ-rays.

Changing the relative angle of the detector changes the Bragg angle with respect to the source and hence provides means for detecting different wavelength γ-rays emitted from the source. Consequently, scanning or rotating the crystal with respect to an extended source produces a γ-ray spectrum. Therefore, the dislocation-free single crystal of the present invention may be employed in a γ-ray spectrograph. For extended sources, data processing is provided to separate the directional and wavelength dependence of the intensity variation.

Reduction in background radiation, which is essentially determined by crystal thickness, may be made quite large, greater than $10^{12}$. Therefore, the use of the present invention makes it possible to detect a weak γ-ray source, even in the presence of a large isotropic background.

In a specific embodiment of the invention, the dislocation-free crystal is employed in conjunction with a γ-ray source and data processing apparatus to provide for imaging of objects. In this embodiment, the dislocation-free crystal is employed as a collimator and is surrounded by an anticoincidence counter, and an γ-ray detector is disposed adjacent the crystal in order to detect transmitted γ-rays. The γ-ray detector comprises an imaging proportional counter.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
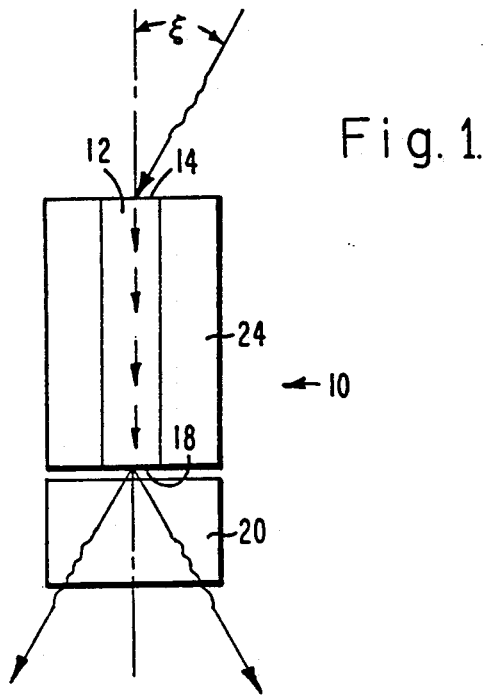
FIG. 1 is a plan view of an γ-ray detector in accordance with the principles of the present invention.

Referring now to FIG. 1, there is shown a Borrmann effect γ-ray or x-ray detector 10 in accordance with the principles of the present invention. The detector 10 comprises a dislocation-free single crystal 12 made of a commercially available material such as silicon or germanium, for example. The crystal 12 is a crystal in which the individual atoms or molecules are located in a fixed lattice structure. One end of the crystal 12 provides an input surface 14, while the opposite end of the crystal 12 provides a transmission surface 18. The crystal 12 may be surrounded by a γ-ray shield 24 employed as an anticoincidence counter made of a material such as sodium iodide, cesium iodide, or plastic, for example. Positioned adjacent the transmission surface 18 is a γ-ray detector 20. The detector 20 typically comprises a scintillation counter, for example, and may be a lithium doped germanium detector, or the like.

The principle of operation of the Borrmann effect γ-ray detector 10 of the present invention is shown in FIG. 1. The dislocation free single crystal 12 is surrounded by the active shield 24. The γ-rays that pass through the crystal 12 at the Bragg angle are detected by the detector 20. The length of the crystal 12 is chosen such that a predetermined background reduction ratio is satisfied. For example, for 511 keV radiation, the ratio of γ-rays that satisfy the Bragg condition to the off Bragg single γ-rays is $10^{12}$ for a 130 cm long crystal 12, for example. The transverse dimension of the crystal 12 determines the effective area of the detector 10. At present 30 centimeter diameter silicon dislocation-free single crystals 12 are commercially available.

Figure 2:
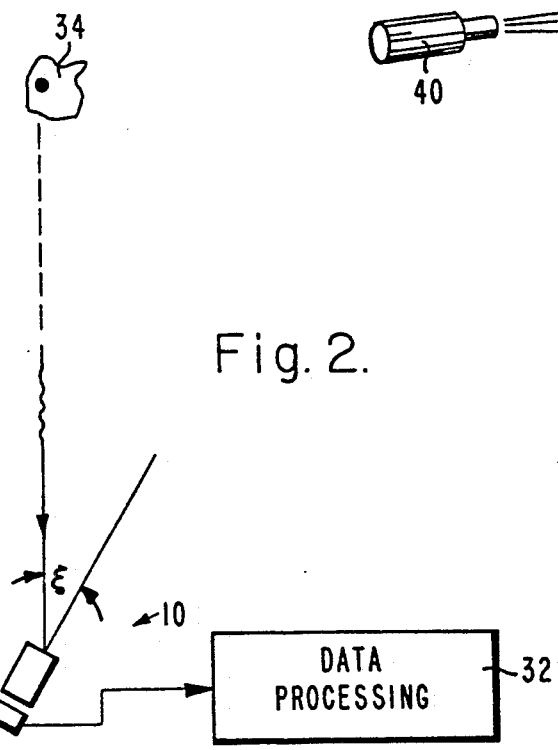
FIG. 2 is an illustration of the γ-ray detector of the present invention employed to monitor a remote γ-ray source.

In the embodiment shown in FIG. 2, which is adapted for detecting remote sources, the intensity of the γ-rays demands the use of a high detectivity detector 20, such as is provided by a liquid nitrogen cooled germanium detector, for example. The liquid nitrogen cooled germanium detector typically includes a cold finger that is coupled to a liquid nitrogen bath, for example. However, conventional uncooled detectors 20 may be readily employed depending on the application and the intensity of the γ-rays that are to be detected.

It is known that when a γ-ray enters a dislocation-free single crystal at the Bragg angle, γ-ray absorption of the crystal is reduced by a factor of 100–200 compared with the normal γ-ray absorption of the material. This anomalous transmission of the incident radiation is known as the Borrmann effect. The Borrmann effect describes the fact that when a γ-ray enters a dislocation-free single crystal at the Bragg angle $\zeta$ there is a drastic decrease of the absorption coefficient. The Bragg angle is defined by the equation $n\lambda = 2d \sin \zeta$, where $\lambda$ is the wavelength of the γ-ray, d is the lattice constant of the crystal, $\zeta$ is the Bragg angle, and n is an integer. The transmitted radiation is split into two equal intensity parts separated by $2\zeta$. There is a third component, the normally transmitted γ-ray, but it is weak compared with the anomalously transmitted radiation.

The Borrmann effect is best described by the dynamical theory of γ-ray absorption. It can be shown from Maxwell's equations that in a crystal, a standing wave pattern is set up similar to standing waves in a waveguide. There are two solutions in the case of γ-ray propagation in single crystals, one with nodal planes passing through the atom sites, the other with antinodes at the atom sites. In the first case, the absorption is appreciably reduced, while in the second case, the absorption is enhanced. The first case, therefore, describes the Borrmann effect. The absorption coefficient due to inelastic interactions of γ-rays with electrons, primarily caused by the photo effect for γ-rays of energies up to a few hundred keV, is reduced about two orders of magnitude in comparison with its value far from the Bragg condition.

With reference to FIG. 2 the detector 10 may be utilized to examine a remotely located γ-ray source 34, for example. The detector 10 is oriented at the Bragg angle $\zeta$ for a particular wavelength of interest and the detected γ-rays are counted. For γ-rays of different wavelength, the detector 10 is rotated to a different Bragg angle $\zeta$ and the γ-rays are again detected. A data processing system 32 is coupled to the detector 20 of the detector 10 in order to count the detected γ-rays. Numerous commercially available data processing systems may be employed to process the detected γ-rays.

The normal γ-ray absorption in the crystal 12 is described by the equation $I = I_o e^{-\mu x}$, where I is the intensity of the transmitted radiation, $I_o$ is the intensity of the incident radiation, $\mu$ is the absorption coefficient for the normal transmission, and x is the crystal thickness. The equation $I_B = I_o e^{-\mu_B x}$ describes the anomalous transmission, where $I_B$ and $\mu_B$ are the transmitted intensity and the absorption coefficient for Borrmann effect. The intensity ratio is, therefore, $I_B/I = e^{-(\mu_B - \mu)x}$. The crystal thickness x is given by, $x = \ln(I_B/I) \div (1 - \mu_B/\mu)\mu$; for $\mu_B << \mu$, $x = (1/\mu)\ln(I_B/I)$.

This is a convenient form for x, since the normal absorption coefficients ($\mu$) are tabulated in *The American Institute of Physics Handbook*, Third Edition, 1972, for example, as functions of $\lambda$ and the material, and the dynamical theory predicts the ratio of $\mu/\mu_B$. Normal linear absorption coefficients $\mu$ for different energies for a typical silicon crystal 12 are:

| E(keV) | $\mu$ (cm$^{-1}$) |
|---|---|
| 500 | 0.21 |
| 250 | 0.28 |
| 100 | 0.35 |
| 50 | 0.69 |
| 25 | 3.50 |
| 10 | 46.00 |

In the following $\mu_B \approx \mu/200$ is used. The following table gives the required silicon crystal thicknesses for different ratios $I_B/I$ of Borrmann transmitted radiation to normally transmitted radiation for 511 keV γ-rays.

| $I_B/I$ | x(cm) | $I_B/I_o$ |
|---|---|---|
| $10^{-8}$ | 87 | 0.91 |
| $10^{-10}$ | 110 | 0.89 |
| $10^{-12}$ | 132 | 0.87 |

The ratio $I_B/I_o$ indicates the fraction of Borrmann transmitted intensity to the intensity $I_o$ of radiation incident on the crystal. The background reduction ratio determines the limit of the weakest detectable γ-ray source intensity.

The active shield 24 is used in anticoincidence with the detector 20. Therefore, any γ-ray or any other event that deposits energy in the active shield 24 is not counted. Only the γ-rays that traverse the crystal 12 at the Bragg angle are of interest, and are counted. Other types of events add only to the noise background and are discriminated against. The use of a cooled germanium crystal as the detector 20 reduces the background further since the linewidth is a factor of 20–40 narrower than a scintillation crystal linewidth.

For the γ-ray detector 10, the condition of observability is that the statistical fluctuation of the background radiation is less than the intensity of the point source. The requirement for observability is therefore (Number of background counts)$^{\frac{1}{2}}$ ÷ (Number of anomalously transmitted γ-rays from the point source) < 1.

The background is typically comprised of diffuse sources, atmospheric nuclear excitation due to cosmic radiation and instrument material excitation by cosmic radiation. It is assumed in the following that the thickness of the crystal 12 is chosen such that the ratio of normally to anomalously transmitted radiation is $I/I_B \leq 10^{-12}$.

The following table lists the typical counting times for silicon single crystals 12 used in the detector 10. The weakest 511 keV γ-ray point sources that can be detected are estimated below for a 30 centimeter diameter detector and a 300 centimeter diameter telescope, where n = 0.003 counts/second centimeter$^2$, and $t = n/I^2 A^2$.

| Source Intensity I | Required Counting Time (sec) | |
|---|---|---|
| photons/cm$^2$sec | 30 cm | 300 cm |
| $10^{-3}$ | $3 \cdot 10^{-3}$ | $3 \cdot 10^{-5}$ |
| $10^{-4}$ | $3 \cdot 10^{-1}$ | $3 \cdot 10^{-3}$ |

-continued

| Source Intensity I photons/cm²sec | Required Counting Time (sec) | |
| --- | --- | --- |
|  | 30 cm | 300 cm |
| $10^{-5}$ | 30 | $3 \cdot 10^{-1}$ |
| $10^{-6}$ | $3 \cdot 10^3$ | 30 |
| $10^{-7}$ | $3 \cdot 10^5$ | $3 \cdot 10^3$ |
| $10^{-8}$ | $3 \cdot 10^7$ | $3 \cdot 10^5$ |

Figure 3:
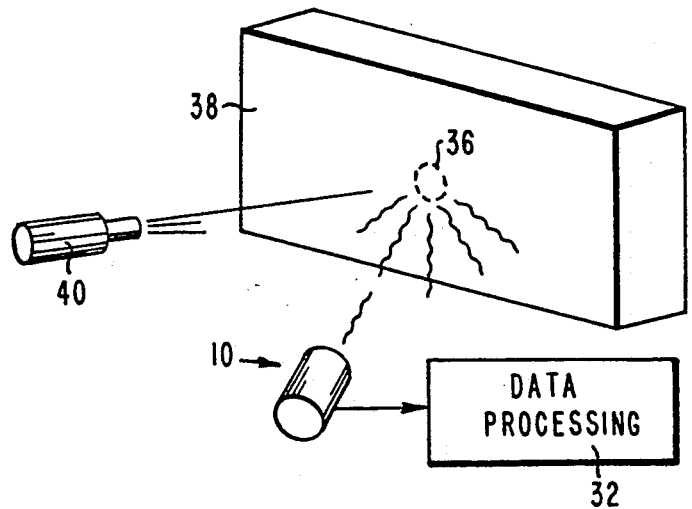
FIG. 3 is an illustration showing the use of the detector of the present invention employed as a collimator to examine the internal contents of an object.

With reference to FIG. 3 the detector 10 may be utilized to examine the location, shape and size of an object 36 embedded in materials such as a concrete wall 38, for example. Such objects 36 may include microphones or other electronic or optical components, for example. In these instances it is necessary to irradiate the wall 38 with a suitable $\gamma$-ray source 40. This causes materials in the wall 38 to emit characteristic wavelength $\gamma$-rays ($\gamma$-ray fluorescence). The emitted $\gamma$-rays are in the energy range of 5–10 MeV. The $\gamma$-rays are emitted in the form of line radiation. The energies of these lines are characteristic of the radiating nuclei. In such an application, resolution of an object of 0.1 cm, allowing a statistical variation of 10 percent, typically requires at least $10^6$ $\gamma$-rays to form a picture having a 10 cm × 10 cm area. This requires an $\gamma$-ray source of intensity of about $10^8$ $\gamma$-rays per square centimeter per second. In use, the instrument is pointed at the Bragg angle with respect to surface being examined and the surface is scanned to produce an image.

From the above description, it is seen that the present invention provides a unique high resolution $\gamma$-ray detector in which a single dislocation-free crystal provides a collimator effective for examining $\gamma$-rays in high energy regions, typically, in excess of 300 keV and for detecting objects in low density contrast conditions. The detector is capable of resolving an object to a very high degree of accuracy and, due to commercially available single crystals, can be produced with significant input surface area enabling a detector to operate at relatively high speed and sensitivity.

In addition, the present invention provides for a $\gamma$-ray detector based upon the Borrmann effect in which anomalous transmission of incident $\gamma$-rays at the Bragg angle is used to uniquely detect $\gamma$-rays from a source while drastically attenuating all other incident radiation.

It is to be understood that the above-described embodiments are merely illustrative of some of the many specific embodiments which represent applications of the principles of the present invention. Clearly, numerous and other arrangements can be readily devised by those skilled in the art without departing from the scope of the invention. For example, in different applications, the detectors may include such devices as a scintillation counter or a $\gamma$-ray detecting charge coupled device.

What is claimed is:

1. A $\gamma$-ray detector comprising:
   a dislocation-free single crystal having an input surface and a transmission surface at opposite ends thereof;
   an active shield surrounding the crystal and functioning as an anticoincidence counter; and
   $\gamma$-ray detector means disposed adjacent the transmission surface of the crystal for receiving and detecting $\gamma$-rays of a predetermined wavelength incident on the input surface of the crystal at a specific Bragg angle and transmitted through the crystal.

2. The detector of claim 1 wherein the $\gamma$-ray detector means comprises a $\gamma$-ray detecting charge coupled device.

3. The detector of claim 1 wherein the $\gamma$-ray detector means comprises a nitrogen cooled, lithium doped germanium detector.

4. The detector of claim 1 wherein the $\gamma$-ray detector means comprises an imaging proportional counter.

5. The detector of claim 4 wherein the dislocation-free single crystal comprises a silicon crystal.

6. The detector of claim 4 wherein the dislocation-free single crystal comprises a germanium crystal.

7. The detector of claim 5 wherein the anticoincidence counter comprises a sodium iodide-cesium-sodium chloride crystal.

8. The $\gamma$-ray detector of claim 5 wherein the anticoincidence counter comprises a sodium iodide-cesium-sodium iodide crystal.

9. A $\gamma$-ray detector comprising:
   a dislocation-free single crystal comprising silicon having an input surface and a transmission surface at opposite ends thereof;
   an active shield surrounding the crystal and functioning as an anticoincidence counter; and
   $\gamma$-ray detector means disposed adjacent the transmission surface of the crystal for receiving and detecting $\gamma$-rays of a predetermined wavelength incident on the input surface of the crystal at a specific Bragg angle and transmitted through the crystal.

10. The detector of claim 9 wherein the $\gamma$-ray detector means comprises a nitrogen cooled, lithium doped germanium detector.

* * * * *